Dec. 7, 1965  W. A. FARRAND  3,222,660
MAGNETIC POSITION ENCODER
Filed Sept. 4, 1962  2 Sheets-Sheet 1
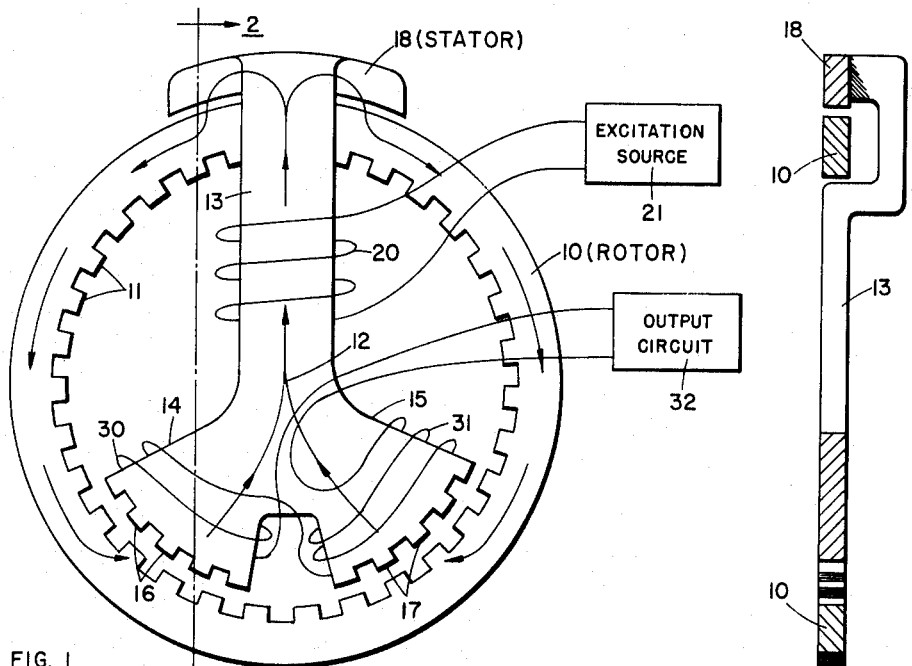
FIG. 1
FIG. 2
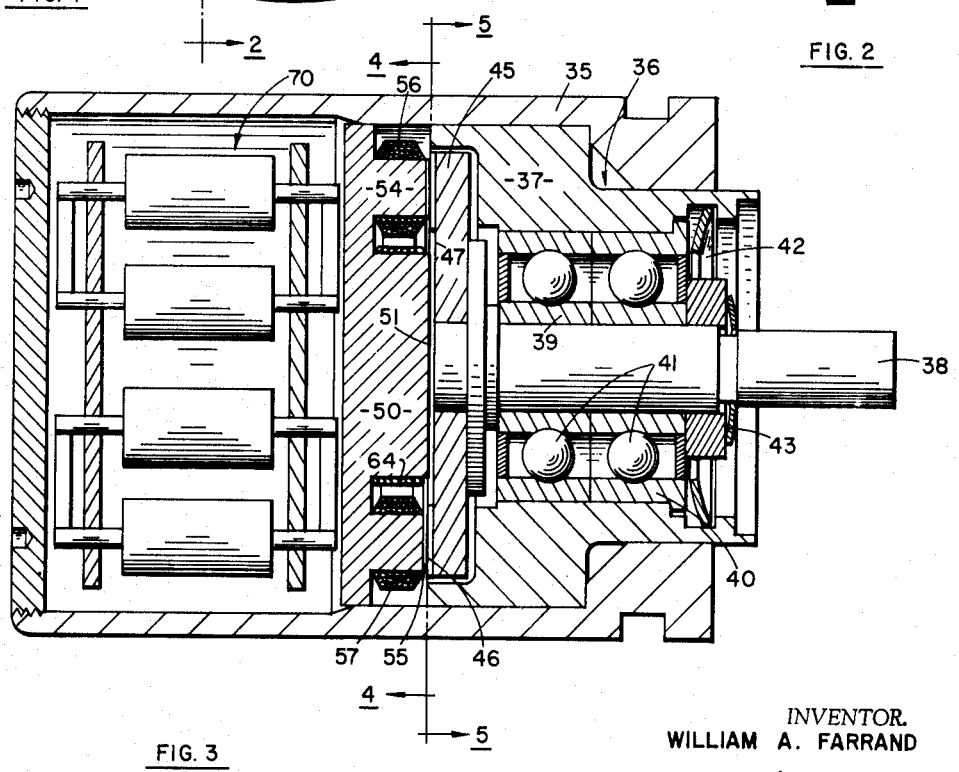
FIG. 3
INVENTOR.
WILLIAM A. FARRAND
BY *Allan Rothenberg*
ATTORNEY Dec. 7, 1965   W. A. FARRAND   3,222,660
MAGNETIC POSITION ENCODER
Filed Sept. 4, 1962   2 Sheets-Sheet 2
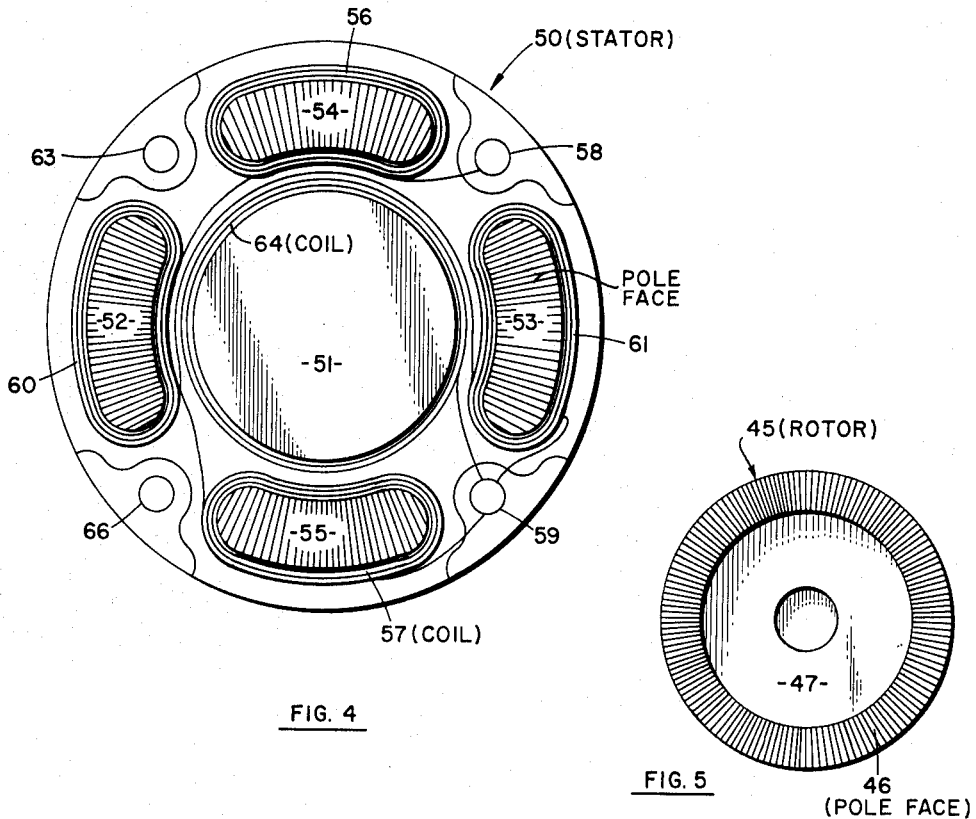
FIG. 4
FIG. 5
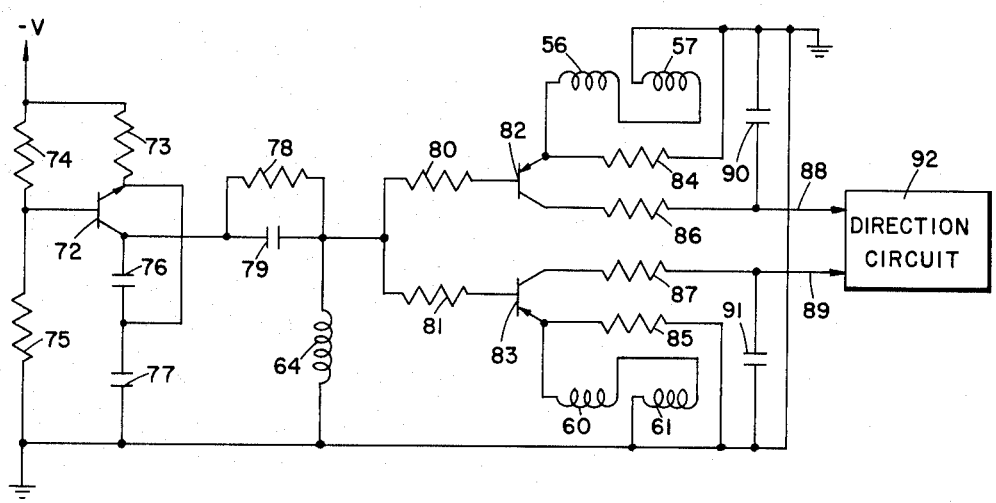
FIG. 6
INVENTOR.
WILLIAM A. FARRAND
BY *Allan Rottenburg*
ATTORNEY United States Patent Office 3,222,660
Patented Dec. 7, 1965

3,222,660
MAGNETIC POSITION ENCODER
William A. Farrand, Fullerton, Calif., assignor to
North American Aviation, Inc.
Filed Sept. 4, 1962, Ser. No. 221,165
4 Claims. (Cl. 340—199)

This invention relates to apparatus for sensing and encoding position and more particularly concerns a multiple pole variable reluctance miniature transducer of high resolution and increased precision.

For reading the position outputs of instruments and other devices having relatively movable parts such as velocity meters, gyroscopes, angle-of-attack meters, and the like, there is required a transducer to convert shaft angle to a desired type of electrical signal. Since inertial navigation equipment and many other systems often employ a digital computer as part of the system it is desired to provide transducers with an output that can be conveniently handled at the input of such a digital computer. Further, the continued and successful efforts to decrease size of systems and components dictates increased miniaturization of the transducing parts for such transducer while, at the same time, increasingly stringent system requirements demand greater precision and resolution.

Accordingly, it is an object of this invention to provide a miniature transducer capable of yielding a digital output signal of increased precision and high resolution.

In carrying out the principles of this invention in accordance with a preferred embodiment, there is provided a transducer or motion sensing device comprising first and second members which are mounted for relative motion along a selected course which may be a straight, curved or circular path as in the case of a shaft angle transducer. The two members are arranged to provide a furcated continuous magnetic flux path therebetween having a pair of branches and a portion common to the branches which extends between the two members. The members are provided with means for varying the magnetic reluctance of the two branches in accordance with the relative motion of the members and are further provided with means which provides the common path portion with a reasonably constant reluctance. The flux path is magnetically excited as by an exciting coil wound around the means which provides the constant reluctance while flux variation of the path branches is sensed by means which is illustrated as comprising a pair of oppositely wound sensing coils on the two branches of the furcated flux path.

More specifically, an illustrated embodiment of the invention comprises an incremental angular resolver having a magnetic rotor and a magnetic stator with mutually facing contiguous surfaces. The rotor surface has an angular peripheral portion thereof formed with a plurality of teeth facing the stator surface while the stator surface has first and second pairs of diametrically opposite poles extending toward the rotor teeth. Each stator pole extends circumferentially for almost a full quadrant of the periphery of its surface and has a plurality of teeth extending toward the rotor. The teeth of each stator pole have a 90° phase relation relative to the teeth of each peripherally adjacent pole so that the teeth of paired, diametrically opposed poles have a 180° phase relation. Both the rotor and stator are formed with an inner pole portion, each contiguous to the inner pole portion of the other, to provide a constant reluctance magnetic gap therebetween. Thus, a closed magnetic path is provided through the constant reluctance magnetic gap between such inner pole portions of the stator and rotor, through the rotor, between the variable reluctance magnetic gaps between the stator pole teeth and the rotor teeth, and through the stator to the constant reluctance magnetic gap. An exciting winding is wound about the inner pole of the stator to provide a magnetic flux in the furcated continuous flux path through the several stator poles and rotor teeth while sensing is provided by series opposed windings on diametrically opposed stator poles.

In accordance with concepts of this invention, the individual teeth are exceedingly small, and all of the same width and same spacing, in order to provide high resolution. Wide poles are employed to increase the flux path by producing a large number of teeth in each pole. The flux conducted by each tooth of a given pole induces a small signal in the coil associated with it. Since the small signals are additively combined in the associated coil, the teeth of the pole effectively provide a signal which is directly proportional to the average of the many small signals, thereby providing what may be referred to as position signal averaging. More important, however, is the greater resolution obtained by the provision of small pole teeth.

An output signal is obtained from two sets of teeth or a pair of poles which have the teeth thereof in phase opposition by the use of parts of the same sensing coil oppositely wound around the two poles to form a pair of series opposed sensing windings. This arrangement provides a differential or subtractive combination of the variable reluctance flux in the several magnetic path branches and thus provides an improved zero stability. The differential combination will eliminate adverse affects such as drift due to change in bias, or the like.

A significant advantage of the described arrangement of employing a single constant reluctance pole resides in the fact that the several wound stator poles may be placed more closely together since they do not require to be spaced apart to accommodate an intermediate exciting pole as in the case of E-shaped stators of the prior art. With the exciting pole offset from the circular course of relative motion there is ample room in a miniature device for winding many turns in the sensing coil around each stator pole while using substantially the entire length of the course of relative circular motion for the extent of the two sets of stator poles. With this arrangement a single exciting pole will provide the excitation flux for each of four transducing parts or sensing poles.

A further advantage of the construction of the described embodiment resides in the use of radial magnetic reluctance gaps upon facing surfaces of rotor and stator to provide for a simplified construction. Further, due to the sensing kinematics angular and parallel alignment errors are not of a first order of significance and tend to affect only sensitivity.

An angular alignment error is an error produced due to misalignment between the axis of rotation of the rotor and the corresponding axis of the stator such that an angle exists between the two axes, and a parallel alignment error is an error produced due to a displacement of one axis relative to the other. Accordingly, either type of alignment error tends to unbalance the signals induced in the series opposed windings of stator pole pairs, but only in amplitude, not in phase, and it is phase, not amplitude, that is of primary importance in a digital system which in effect detects phase as the information desired.

Thus it will be seen that further objects of this invention include the provision of a transducer of unlimited circular motion, increased resolution and improved zero stability with the advantages of position signal averaging, the elimination of drift by differential combination of oppositely phased transducing poles. A further object is the miniaturization of an electromagnetic transducer by a compact arrangement of stator poles.

These and other objects of the invention will become apparent from the following description taken in connection with the accompanying drawings, wherein:

FIG. 1 comprises a functional schematic of certain principles of this invention;

FIG. 2 is a sectional view of FIG. 1 taken on the line 2—2;

FIG. 3 is a sectional view of an assembly of a preferred embodiment of this invention;

FIG. 4 is a sectional view of the assembly of FIG. 3 taken on the line 4—4 with its housing removed;

FIG. 5 is a sectional view on a reduced scale of the assembly of FIG. 3 taken on the line 5—5 with its housing removed; and FIG. 6 is a diagram of the electronic circuit provided in the assembly of FIG. 3.

Referring to FIG. 1 which illustrates certain principles of the invention, there is shown a sensing device or transducer which comprises an annular magnetic rotor 10 having the inner periphery thereof formed with a plurality of evenly spaced teeth 11 of equal width. Mounted for relative pivotal motion about an axis 12 is a second part of the transducer comprising a stator 13 which, like the rotor 10, is formed of a relatively low reluctance magnetic material. The stator 13 includes first and second integral leg portions 14 and 15 which provide first and second magnetic poles adapted to move in contiguous relation relative to the teeth of the rotor 10. Each pole is provided with a relatively large number of teeth 16, 17 having a width and mutual spacing which are identical to the width and mutual spacing of the rotor teeth 11. The stator legs 14 and 15 comprise branches of a closed magnetic flux path between the two transducers. The closed flux path is completed by an exciting pole portion 18 integrated with the stator 13. The pole portion 18 has a pole face which mates with the periphery of the rotor 10 so as to provide for unlimited circular motion with a magnetic gap having a constant reluctance as may be more clearly understood by reference to FIG. 2 which illustrates a sectional view of FIG. 1 taken on a line 2—2.

The magnetic gaps between the stator poles 14 and 15 and the teeth of the rotor 10 vary as one is rotated relative to the other to provide a reluctance therebetween which varies in accordance with the relative rotation. The teeth 16 of the stator pole 14 have a 180° phase relation to the teeth 17 of the stator pole 15 in that teeth 16 are between teeth 11 of the rotor when the teeth 17 are opposite teeth 11 as can be seen in FIG. 1.

An alternating magnetic flux is excited in the furcated continuous magnetic flux path by means of an exciting coil 20 which is wound about a leg of the stator to provide a primary winding excited from a suitable source 21 of alternating current. For sensing relative rotation of the rotor 10, sensing coils 30 and 31 are so wound upon the stator poles 14 and 15 and so interconnected as to provide two secondary windings in series opposition. Thus, current in the sensing coil 30 is always opposed to current in the sensing coil 31 whereby the flux in the two branches of the magnetic flux path are combined to provide a differential signal to a suitable output circuit 32, as will be more particularly described hereinafter.

During a given half cycle of the signal from the excitation source 21, magnetic flux will flow through the continuous flux path in the direction indicated by the arrows. The flux flowing through all the teeth of a given stator pole are additively combined by the associated sensing coil to induce signals which are combined by the series opposed sensing coils 30 and 31 to provide a differential signal to the output circuit 32. If the teeth 17 of pole 15 are exactly aligned with the teeth 11 of the rotor 10, the reluctance of the magnetic gap between the pole 15 and the rotor 10 is relatively low, in which case the teeth 16 of pole 14 will be aligned with spaces between the teeth 11 to provide a magnetic gap of relatively high reluctance. Thus the magnetic flux flowing through pole 15 is at a maximum whereas the magnetic flux flowing through pole 14 is at a minimum and the signals induced in the coils 30, 31 are differentially combined to provide a signal to the output circuit 32. A similar analysis may be made for different rotational positions of the rotor 18.

It may be noted that the stator 13 has its constant reluctance pole 18 offset from the axis 12 of the rotor 10, but not placed between the poles 14 and 15 as in the E-shaped rotors of the prior art, so that the poles 14 and 15 may be spaced only as far apart as necessary to wind the associated coils 30, 31, thereby providing space for a second pair of poles on the stator to detect direction of motion or rotation as will presently be described with reference to FIGS. 4, 5 and 6.

Another advantage of the principles of the invention as illustrated in FIGS. 1 and 2 is the provision of wider poles for greater signal strength and the provision of a large number of small pole teeth for signal averaging. An even more important advantage, as noted hereinbefore, is the greater resolution made possible by the provision of a large number of small teeth since, it should be noted, a rotation of the rotor through an arc equal to the width of a pole tooth produces a change in the amplitude of the signal induced in a given coil. To determine the position of the rotor as it is rotated through a larger arc, it is only necessary to count the changes in the induced signal amplitude from maximum to minimum or minimum to maximum. The provision of a second pole 180° out of phase with the given pole and of the series opposed windings increases the change in amplitude between maximum and minimum to facilitate detecting the changes. Thus, resolution or sensitivity, which is a measure of the smallest angle of rotation which can be detected, is limited only by the smallest width which can be provided for the pole teeth and the diameter of the rotor selected. For example, if pole teeth one mil wide can be provided and a rotor one inch in diameter is selected the grooved annular section of the rotor can be divided into 3,142 one-mil arcs by the pole teeth to provide a sensitivity of about 0.115 degrees or less than 7 minutes. Sensitivity can be readily increased, by simply increasing the rotor diameter, without the loss of any advantages except size. It should be noted, however, that the configuration illustrated in FIGS. 1 and 2 should be provided with a second pair of stator poles having series-opposed windings, as in the preferred embodiment of FIGS. 3, 4 and 5, if the direction of rotation is to be determined also.

The preferred embodiment of a miniature transducer illustrated in FIG. 3 includes a housing 35 in which a rotor assembly 36 is mounted. The rotor assembly includes an assembly sleeve 37 which is secured to the housing 35. A shaft 38, having an end thereof adapted to be attached coaxially to a member whose angular motion is to be indicated is connected to a rotor 45. It is to be understood that the housing 35 is to be affixed to a stationary support or other reference element with respect to which the angular motion is to be measured.

Shaft 38 is journalled to the sleeve 37 by means of inner and outer bearing sleeves 39 and 40 affixed to the shaft 38 and sleeve 37, respectively, together with a number of bearing spheres 41 restrained between the sleeves 39 and 40. Resilient annular retaining rings 42 and 43 are mounted between suitable shoulders on the sleeve 37 and shaft 38 and the bearing sleeves in order to retain the bearing assembly and shaft in position. The rotor 45 has an aperture in the center into which the end of the shaft 38 is press fit.

As illustrated in FIG. 5 the rotor, which in this embodiment may have a diameter of approximately .62 inch and a shaft receiving aperture of a diameter such as .125 inch, is formed with an annular set of evenly spaced equal width teeth 46 disposed around the entire periphery of that face of the rotor which is contiguous with a corresponding face of the stator. In the illustrated embodiment the rotor teeth and spaces therebetween are approximately .005 inch wide with the spaces being approximately .006 inch deep. Between the shaft receiving central aperture of the rotor and its annular set of teeth there is an annular flat surface 47 providing an inner or centrally located pole which cooperates with a corresponding exciting stator pole to provide a constant reluctance magnetic gap.

Securely mounted within the housing 35 is the stator 50 which is shown in further detail in FIG. 4. Stator 50 is formed with a centrally located or inner exciting pole 51 which cooperates with the center pole 47 of the rotor to provide a constant reluctance magnetic gap. The stator also is provided with two pairs of diametrically opposite sensing poles 52, 53 and 54, 55. Each stator sensing pole has a winding thereon with the winding of the poles of each pair being connected in series opposition. Thus poles 54 and 55 are provided with windings 56 and 57 respectively which are connected to each other and wound in opposition, this double winding having one end brought to a stator output terminal 58 with the other end being brought to a common stator output terminal 59. Poles 52 and 53 are provided with windings 60 and 61 respectively which are connected to each other in series opposition, having one end of the pair of windings brought out to a stator output terminal 63 while the other end of these windings is brought out to the common stator terminal 59. The exciting inner pole 51 of the stator is provided with a winding 64 having one end brought out to a stator terminal 66 and the other end thereof brought out to the common stator terminal 59.

In an embodiment of this transducer which has been built and successfully tested it has been found convenient to employ fifty turns for the center coil 64 while each of coils 56, 57, 60 and 61 is made with 200 turns. The poles project substantially .080 inch from the surface of the stator and each pole together with the winding thereon extends for almost a full quadrant of the circumference of the face of the stator whereby the poles may be of maximum area. This advantageous arrangement is possible since the inner pole 51 which is employed to excite all of the stator poles is centrally located and offset radially from the circular course of relative motion of these poles with respect to the rotor teeth.

As in the embodiment of FIG. 1 each of the stator poles is provided with a large number of teeth each of which has a width equal to the width of the rotor teeth and also has identical spacing. However, as previously mentioned the teeth of one pair of poles such as the teeth of poles 54 and 55 have a mutually opposite phase relation. That is, as previously described, the teeth of a pole such as 54 have a 180° phase relation with respect to the teeth of the opposite pole 55 so that when the teeth of the latter are exactly opposite corresponding teeth of the rotor the teeth of the pole 54 will be opposite spaces between rotor teeth. So too, the teeth of stator pole 52 have a 180° phase relation with respect to the teeth of pole 53. Further the teeth of each pole have a 90° or quadrature relation with respect to the teeth of each adjoining pole. That is to say if the teeth of pole 54 be considered in any position to have a zero phase with respect to the rotor teeth, then the teeth of pole 53 have a 90° phase with respect to the rotor teeth, the teeth of pole 55 have a 180° phase with respect to the rother teeth and the teeth of pole 52 have a 270° phase with respect to the rotor teeth. Thus the two pairs of poles are in quadrature with one another, an arrangement which is employed to achieve sensing of direction of relative motion in addition to magnitude as will be more particularly explained hereinafter.

The electrical circuit for energization and sensing of the stator is mounted within the housing in an exemplary arrangement physically depicted at 70 of FIG. 3. This circuit is shown schematically in FIG. 6 wherein excitation source 21 is shown as an oscillator comprising a transistor 72 having its emitter and base connected to a source of negative potential —V through respective resistors 73 and 74, and its base and collector connected to ground through resistor 75 and series capacitors 76, 77, respectively. Regenerative feedback is provided by a connection from the junction between the capacitors 76 and 77 to the emitter. A resistor 78 in parallel with a capacitor 79 couples the output of the oscillator to one end of the stator exciting coil 64, the other end of which is grounded.

The oscillatory output is also coupled via resistors 80 and 81 to a pair of synchronous demodulators comprised of transistor switches 82 and 83 which are switched on and off at the oscillator frequency determined by the parameters of the coil 64 and the capacitors 76 and 77. The emitters of each of the transistor switches 82 and 83 are grounded through resistors 84 and 85 respectively. The differentially or subtractively combined output of each pair of sensing coils such as the pair 56, 57 and the pair 60, 61 is switched through the synchronous transistor switches to be fed via resistors 86, 87 respectively to the two outputs leads 88, 89 of the two pairs of transducing poles. Filtering of the output signal is provided by capacitors 90 and 91 connected between ground and each output line.

As the input shaft 38 is rotated, an output signal is produced on each of leads 88 and 89, which comprises a substantially square wave with the waveform on line 88 having a 90° phase relationship with respect to 89. The two square wave signals on output leads 88 and 89 are fed to a direction circuit 92 which provide a digital indication of the relative motion of the two transducing parts and an indication of the direction of such motion.

The square-wave output signal on a given lead changes between maximum and minimum voltage levels once for each increment of rotation of the shaft 38 which moves a point on the periphery of the rotor through an arc of predetermined length which is subtended by a chord having a length equal to the width of the teeth 46, and spaces between the teeth. Since the square-wave output signal on the other lead is leading or lagging by 90°, and its leading or lagging relationship is known, direction of motion can be determined by ascertaining which output signal changes voltage level first as the shaft 38 is rotated through an arc of the predetermined length. Thus, the output signal from a single transducing part can, for analysis, be assumed to be a sinusoidal signal which can be shaped into a square waveform A. Since the second transducing part is displaced to sense rotation through the same arc as the first transducing part, but half an arc (90° of the waveform A) later, the direction of rotation can be interpreted. If waveform A leads waveform B in time for rotation in one direction, the waveform B must lead the waveform A for rotation in the opposite direction, even when the rate of change of the shaft position is not constant.

Although the invention has been described and illustrated in a preferred embodiment, it is to be clearly understood that the same is by way of illustration and example only and is not be taken by way of limitation, the spirit and scope of this invention being limited only by the terms of the appended claims.

I claim:
1. An incremental angular resolver comprising
   a magnetic rotor and a magnetic stator having mutually facing contiguous surfaces,
   said rotor surface having an annular peripheral portion thereof formed with a plurality of substantially equal- ly spaced and radially disposed teeth extending from said rotor surface toward said stator surface, said stator surface having first and second pairs of poles extending toward said rotor teeth, each of said poles having a plurality of radially disposed teeth extending toward said rotor teeth, with the same spacing as teeth of said rotor, the teeth of each pole of a given pair having a 180° space-phase relation with the teeth of the other pole of said given pair, the teeth of one pole pair having a 90° space-phase relation with the teeth of the other pole pair, said stator surface having an inner pole contiguous with the inner portion of the contiguous stator surface to provide a constant reluctance magnetic gap therebetween, said first and second pole pairs each having a pair of sensing windings, one winding on each of the poles of a pole pair, the sensing windings of a given pair of poles being connected in series opposition, said inner pole of said stator having an exciting winding wound thereon, means for providing an alternating current to said exciting winding, and an output circuit means connected to said sensing windings for providing an indication of the direction and magnitude of relative rotation of said rotor and stator, said circuit means including a direction circuit and two synchronous switching means, each switching means having a control terminal, an input terminal and an output terminal, said control terminal being connected to said exciting winding, and said input and output terminals being connected in series between said direction circuit and series opposed windings of a given pair of poles, for producing square wave signals from which said indication is derived.

2. An incremental angular resolver comprising a magnetic rotor and a magnetic stator having mutually facing contiguous surfaces, said rotor surface having an annular peripheral portion thereof formed with a plurality of substantially equally spaced and radially disposed teeth extending from said rotor surface toward said stator surface, said stator surface having a plurality of first and second poles associated in pairs extending toward said rotor teeth, each of said first and second poles having a face with a plurality of radially disposed teeth extending toward said rotor teeth, with the same spacing as teeth of said rotor, the teeth of a given one of said first poles having a predetermined space-phase relation with the teeth of an associated one of said second poles, said stator surface having an inner pole magnetically connected to said plurality of first and second poles and projecting toward the inner portions of the rotor surface to provide a constant magnetic gap therebetween, said first and second poles each having a sensing winding thereon, the sensing windings of a given pair of poles being connected in series opposition, the inner pole of said stator having an exciting winding wound thereon, means for providing an alternating current to said exciting winding, and an output circuit means connected to said sensing windings for providing an indication of the direction and magnitude of relative rotation of said rotor and stator, said circuit means including a direction circuit, a synchronous switching means for each pair of poles, each switching means having a control terminal, an input terminal and an output terminal, said control terminal being connected to said exciting winding and said input and output terminals being connected in series between said direction circuit and two series opposed windings of a pair of poles, for producing square wave signals from which said indication is derived.

3. An incremental angular resolver comprising a magnetic rotor and a magnetic stator having mutually facing contiguous surfaces, said rotor surface having an annular peripheral portion thereof formed with a plurality of substantially equally spaced and radially disposed teeth extending from said rotor surface toward said stator surface, said stator surface having a plurality of outer poles associated in pairs extending toward said rotor teeth, each of said poles having a face with a plurality of radially disposed teeth extending toward said rotor teeth with the same spacing as said rotor teeth, the teeth of each pole of a given pair having a 180° space-phase relation with the teeth of the other pole of said given pair, and said stator surface having an inner pole magnetically connected to said outer poles and projecting toward the inner portion of the rotor surface to provide a constant magnetic gap therebetween, said outer poles each having a sensing winding thereon, the sense windings of a given pair of poles being connected in series opposition, the inner pole of said stator having an exciting winding wound thereon, means for providing an alternating current to said exciting winding, and an output circuit means connected to said sensing windings for providing an indication of the relative rotation of said rotor and stator, said circuit means including a direction circuit, a synchronous switching means for each pair of poles, each switching means having a control terminal, an input terminal and an output terminal, said control terminal being connected to said exciting winding and said input and output terminals being connected in series between said direction circuit and two series opposed windings of a pair of poles, for producing square wave signals from which said indication is derived.

4. An incremental angular resolver comprising a magnetic rotor and a magnetic stator having mutually facing contiguous surfaces, said rotor surface having an annular peripheral portion thereof formed with a plurality of substantially equally spaced teeth extending from said rotor surface toward said stator surface, said stator surface having a plurality of first and second poles associated in pairs extending toward said rotor teeth, each of said poles having a plurality of teeth extending toward said rotor teeth with the same spacing as teeth of said rotor, the teeth of each pole of a given pair having a 180° space-phase relation with the teeth of the other pole of said given pair, said stator having an exciter pole magnetically connected to said first and second poles and projecting toward said rotor to provide a constant reluctance magnetic gap between said stator and rotor, said first and second poles of a given pair each having a sensing winding thereon, the associated sensing windings of said given pair of poles being connected in series opposition, an exciting winding wound on said exciter pole, means for providing an alternating current to said exciting winding, and an output circuit means connected to said sensing windings for providing an indication of the relative rotation of said rotor and stator, said circuit means including a synchronous switching means for each pair of poles connected in series with associated sensing windings, said switching means having a control means connected to said exciting windings for producing square wave output signals from which said indication is derived.

References Cited by the Examiner
UNITED STATES PATENTS

| | | | |
|---|---|---|---|
| 705,482 | 7/1902 | Thiermann | 340—196 |
| 2,650,352 | 8/1953 | Childs | 340—196 |
| 2,669,126 | 2/1954 | Simmons | 340—196 |
| 2,905,874 | 9/1959 | Kelling | 340—199 |
| 3,068,386 | 12/1962 | Jaeger | 340—196 |
| 3,099,830 | 7/1963 | Wayman | 340—196 |

FOREIGN PATENTS 22,307  11/1902  Great Britain.

THOMAS B. HABECKER, *Acting Primary Examiner.*
NEIL C. READ, *Examiner.*